United States Patent [19]

Lesage

[11] 4,062,822

[45] Dec. 13, 1977

[54] PROCESS FOR MANUFACTURING HYDRAULIC CONCRETES, MORTARS AND CEMENT SLURRIES OF IMPROVED PROPERTIES

[75] Inventor: Jean Lesage, Elancourt, France

[73] Assignee: Institut Francais du Petrole, France

[21] Appl. No.: 578,184

[22] Filed: May 16, 1975

[30] Foreign Application Priority Data

May 24, 1974 France ................... 74.18523

[51] Int. Cl.$^2$ ................................ C04B 7/35
[52] U.S. Cl. .................. 260/29.4 R; 260/29.2 EP; 260/29.6 S; 260/29.4 UA; 106/90
[58] Field of Search .................. 106/90; 260/29.2 EP, 260/29.6 S, 42.13, 29.4 R, 29.4 UA

[56] References Cited

U.S. PATENT DOCUMENTS

| 3,240,736 | 3/1966 | Beckwith | 106/90 |
| 3,767,436 | 10/1973 | Peppler et al. | 106/90 |

*Primary Examiner*—J. Poer
*Attorney, Agent, or Firm*—Craig & Antonelli

[57] ABSTRACT

Process for preparing hydraulic cement slurries, concretes and mortars by admixing the usual components of said products with a hardenable fluidifying agent including in combination an aqueous solution of at least one epoxy-resin in a proportion from 0.5 to 10% of the cement weight, a hardening agent, an aqueous solution of melamine-formaldehyde at a 5 to 30% concentration thereof, in an amount from 1 to 10% of the cement weight and, optionally, an additional amount of elastomer latex in a proportion from 1 to 20% of the cement weight.

8 Claims, No Drawings

PROCESS FOR MANUFACTURING HYDRAULIC CONCRETES, MORTARS AND CEMENT SLURRIES OF IMPROVED PROPERTIES

This invention concerns a new process for manufacturing tight hydraulic concretes, mortars and cement slurries having improved properties.

The preparation of hydraulic mortars and concretes by mixture of cement granular materials or sand aggregates, fine gravels, pebbles, etc . . . and water, requires that the mixtures be sufficiently fluid to substantially fill the cofferings and embed the armatures.

For this purpose, it is necessary, in most cases, to introduce, during the mixing step, an amount of water very substantially greater than the theoretical amount required for hydration of the cement, which theoretical amount is close to 23% by weight of the cement, said water excess acting as a plasticizer and thus improving the rheologic qualities of the product. The required water excess, normally amounts to 22% by weight of the cement. Accordingly, the total water amount is of the order of 45% by weight of the cement. However, it is well known that the water excess is responsible for a certain number of defects of the concrete: porosity resulting in a permeability, contraction fissures, lack of compactness resulting in a weakening of the mechanical properties.

Numerous searches have been made with a view to reducing the water amount used in the mixing step, so as to avoid the above-mentioned inconveniences, while still ensuring a sufficient fluidity of the mortar or concrete. It is possible, for example, to modify the interfacial tension of water and increase the wettability of the granular materials or aggregates, but the reduction of the required water amount is still low. It is also possible to improve the fluidity of mortars and concretes and strengthen their structure by coating their aggregates with a film of epoxy resin, but it has been observed that such a process resulted in the formation of undesired concentrations of resin within the body of the mortar or concrete, thereby resulting in a poor strengthening of the crystalline texture of the cement.

Furthermore, in order to improve the strengthening of the crystalline structure of the cement, a process has been proposed in which there is introduced into the hydraulic cement slurries, concretes or mortars, a viscous hardenable bending agent (particularly an epoxy resin), previously admixed with a powdered material acting as a support, whose grains have a size smaller than 80 microns. By this process it is possible to substantially decrease the amount of water used in the mixing step, to significantly increase the mechanical properties of the cement slurries, mortars and concretes and to decrease by one half their permeability.

It is the object of the invention to provide an improved process for preparing hydraulic cement slurries, concretes and mortars, in which the required amount of water in the mixing step can be further decreased and the mechanical qualities of the resulting product accordingly improved.

This process, in which the usual components of the cement slurries, concretes and mortars are admixed with a hardenable fluidifying agent, is remarkable in that said agent comprises, in combination, at least one expoxy resin in the form of an aqueous emulsion, a hardening agent for said resin and an aqueous solution of melamine-formaldehyde.

It has been observed, surprisingly, that the reduction in the mixing water amount, achieved by the process of the invention, is substantially greater than the reduction which would result from the separate use of the epoxy resin or the melamine-formaldehyde resin. The ratio water-cement (W/C) may be reduced to a remarkable extent down to a value of 0.25 close to the minimum amount required for a complete hydration of the cement, although each of the epoxy- and melanine-formaldehyde resins, taken separately, does not provide for a decrease of the ratio W/C to a value of less than 0.33. As a result thereof, there is obtained better mechanical properties and a very substantially decreased permeability to water and hydrocarbons.

A further reduction of the amount of mixing water, according to the invention may still be achieved by adding to the resins an emulsion in water of elastomer particles, such as latex.

The invention may even provide cement slurries, mortars and concretes completely tight to water and hydrocarbons.

The process of the invention is, as a consequence, useful in particular, for the manufacture of concretes, mortars and cement slurries for the construction of terraces, for making road pavements. Generally, it provides tight concretes, mortars and cement slurries and, more particularly, mortars and cement slurries for use in the construction of reservoirs tight to water and hydrocarbons.

The aqueous emulsion of hardenable epoxy resin, may be introduced in the concrete or the mortar by fixing it on a carrier, for example a powdered solid material of siliceous or calcareous nature when the emulsion is mixed. It is also possible to introduce it at any moment during the preparation of the concrete or mortar, either by precoating granulates or aggregates with said aqueous solution, or by admixing it to the cement or even to a portion of the mixing water.

Irrespective of the way of introducing the resin among the components of the concrete or mortar, it seems that the advantages, resulting from its introduction in the form of an aqueous solution, are due to the fact that the resin emulsion does not disturb the hydration of the cement and makes easier the dispersion of the resin within the mixture of the mortar or concrete components.

The epoxy resin emulsion may be used in a proportion from 0.5 to 10% by weight of emulsion with respect to the cement and, preferably, in a proportion from 1 to 3%.

The epoxy resins which can be used in the process of the invention, will be obtained, for example, by the conventional condensation reaction of biphenol A with an epichloridrine. The resin used in an aqueous solution will contain a hardening agent of the polyamine type.

The aqueous solution of mellamine-formaldehyde, used in combination with the aqueous emulsion of thermohardening resin, has a melamine-formaldehyde concentration from 5 to 30%, this concentration being advantageously about 20%.

This solution of mellamine-formaldehyde will be used in a proportion of 1 to 10% with respect to the cement.

The cement slurries, mortars and concretes, prepared in these conditions are less permeable to water and to hydrocarbons and have very improved mechanical properties, as compared to the corresponding properties of the conventional cement slurries, mortars and concretes: the traction strength is multiplied by 2 to 3, the compression resistance is improved by 50% and the contraction accompanied with water release is close to 0.

The cement slurries, mortars and concretes, achieved according to the invention by using an epoxy resin in emulsion, associated to a melamine-formaldehyde resin in solution, can be made tight with respect to the petroleum products by adding to their components an emulsion in water of elastomer particles (or elastomer latex) in a proportion from 1 to 20% by weight of latex with respect to the cement and preferably in a proportion from 5 to 10%.

The elastomer may be either natural or synthetic, but it is preferred to make use of a styrene-butadeiene copolymer latex. By way of non-limitative example, it is possible to make use advantageously of a latex containing 40% by weight of dry material (elastomer). The products obtained in these conditions are absolutely tight to water and hydrocarbons.

The following comparative examples illustrate the process of the invention and make the advantages thereof apparent.

EXAMPLE 1

A mortar is prepared according to the conventional method from a standardized sand, CPA 325 cement proportioned at 350 kg/m³ and water.

The ratio W/C required for obtaining a satisfactory randiness is 0.45.

The bending strength of the mortar so produced is close to 45 bars.

EXAMPLE 2

To a conventional mortar, there is added, at the end of the mixing step, according to a previously proposed process, an aqueous solution of epoxy resin of low viscosity, containing a hardening agent and diluted with an equal volume of water. This emulsion being first admixed with silica grains of less than 20 microns diameter. Silca and epoxy resin are respectively admixed in a proportion of 10% and 2% by weight with respect to the cement. The emulsion contains 70% by weight of the epoxy resin.

The ratio W/C required for obtaining a randiness of the same order as in example 1, is 0.33.

The permeability to water and hydrocarbons is about four times less than in the case of example 1.

EXAMPLE 3

To a conventional mortar there is added, at the beginning of the mixing step, a melanine-formaldehyde resin as a 20% aqueous solution, in an amount of 10% by weight of solution with respect to the cement.

The ratio W/C is decreased to 0.35.

EXAMPLE 4

To the composition of example 2, in which the proportion of epoxy resin is decreased by one half, there is added a melamine-formaldehyde resin in a 20% aqueous solution, in an amount of 5% by weight of solution with respect to the cement.

The ratio W/C required for obtaining a handiness comparable with that of example 1 is 0.28; it is therefore apparent that the melamine-formaldehyde resin enhances the water reduction effect of the emulsified epoxy resin.

The mortars so prepared are absolutely tight to water, their bending strength is from 130 to 140 bars and their traction strength reaches 70 bars.

EXAMPLE 5

To the composition of example 4 is added a rubber latex SBR containing 40% of dry material, in an amount of 10% by weight of latex with respect to the cement.

The ratio required for obtaining a handiness comparable to that of example 1 is 0.24, and it is therefore apparent that SBR latex enhances the effect of reducing the required water amount resulting from the join use of the epoxy resin in aqueous solution and of the melamine-formaldehyde resin in aqueous solution.

The mortars so prepared are absolutely tight to water and hydrocarbons and their contraction is reduced by 90% with respect to a conventional mortar. Their bending strength is from 145 to 150 bars. Their traction strength is from 80 to 90 bars.

EXAMPLE 6

In a conventional concrete proportioned at 350 kg/m³ of cement, there is introduced, during the mixing step, a melamine-formaldehyde resin as a 20% aqueous solution and a SBR latex containing 40% of dry material, with the respective proportions by weight of 5% of resin solution and 10% of latex with respect to the cement, as well as an epoxy resin as an aqueous solution containing 70% of dry material, deposited on a siliceous carrier, the proportion of epoxy resin and silica with respect to the cement being respectively 2% and 10%.

The concrete obtained with a ratio W/C = 0.24 can be placed in position easily by the usual vibration methods.

It is absolutely tight to water and to hydrocarbons and, moreover, has a very small contraction rate (lower than 0.1 mm per meter).

The mechanical properties of said concrete are as follows:
traction strength: 60 bars
bending strength: 100 to 130 bars
compression strength: 500 to 600 bars By way of comparison, there is given below the properties of a concrete prepared according to conventional methods and proportioned at 350 kg/m³ of CPA 325 cement, with a ratio W/C of 0.45:
traction strength: 25 bars
bending strength: 30 to 40 bars
compression strength: 450 bars
contraction: 0.6 mm per meter Moreover, such a concrete, prepared in a conventional manner, is substantially permeable to water and hydrocarbons.

I claim:
1. A process for the preparation of hydraulic cement products selected from the group consisting of slurries, concretes and mortars, comprising the step of admixing the usual components of said products with a hardenable fluidifying agent comprised of a combination of at least one epoxy resin in the form of an aqueous emulsion, a hardening agent for said resin and an aqueous solution of melamine-formaldehyde; the aqueous emulsion of epoxy resin being admixed in an amount from 0.5 to 10% of the cement weight and the melamine-formaldehyde aqueous solution being admixed in an amount from 1 to 10% of the cement weight.

2. A process according to claim 1, in which the aqueous solution of melamine-formaldehyde contains 5 to 30% of melamine-formaldehyde.

3. A process according to claim 1, in which the aqueous emulsion of epoxy resin is introduced in an amount from 1 to 3% of the cement weight.

4. A process according to claim 1 further comprising adding to said components an elastomer latex.

5. A process according to claim 4, in which the latex is added in an amount from 1 to 20% by weight of the cement.

6. A process according to claim 4, in which latex is added in an amount from 5 to 10% by weight of the cement.

7. A process according to claim 1, in which said hardening agent is a polyamine.

8. A process according to claim 4, wherein the elastomer latex is a styrene-butadiene copolymer latex.